June 2, 1925.　　　　　　　　　　　　　　　　　　　　1,540,683
L. E. DURRIN
AUTOMOBILE LUBRICATING MECHANISM
Filed Jan. 17, 1924
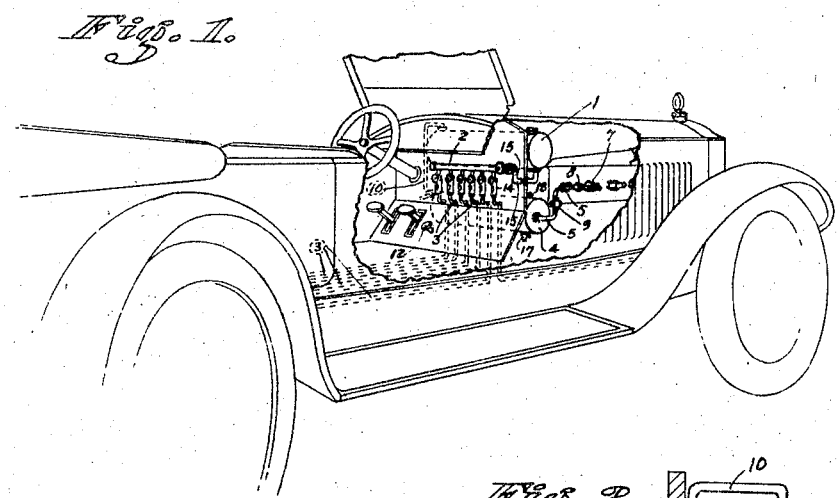
Fig. 1.
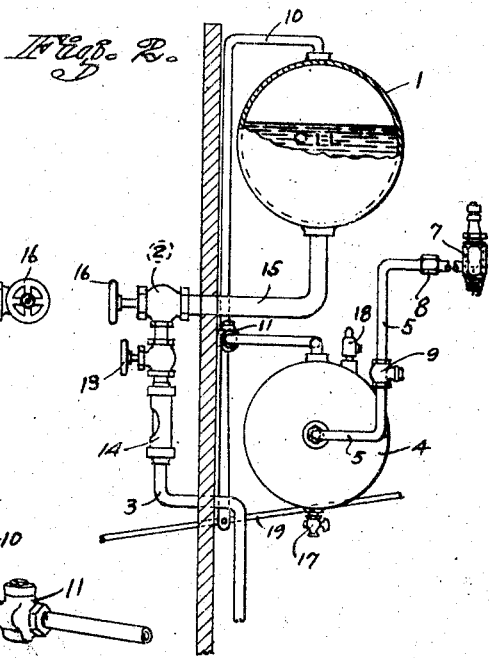
Fig. 2.
Fig. 3.
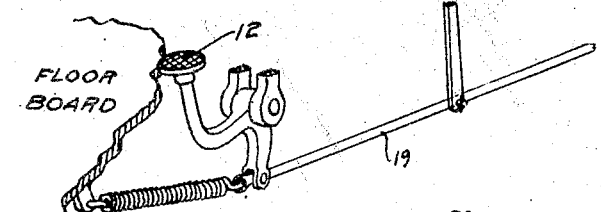
Fig. 4.
Inventor
LEWIS E. DURRIN
By　Munn & Co.
Attorneys.

Patented June 2, 1925.

1,540,683

UNITED STATES PATENT OFFICE.

LEWIS E. DURRIN, OF SAN JUAN BAUTISTA, CALIFORNIA.

AUTOMOBILE LUBRICATING MECHANISM.

Application filed January 17, 1924. Serial No. 686,874.

*To all whom it may concern:*

Be it known that I, LEWIS E. DURRIN, a citizen of the United States, and a resident of San Juan Bautista, county of San Benito, State of California, have invented a new and useful Automobile Lubricating Mechanism, of which the following is a specification.

This invention relates to mechanism as used for the lubrication of automobiles, and particularly to apparatus which will automatically lubricate, from one source, all the remote points on the machine which require lubrication.

The objects of my invention are to provide apparatus which will be conveniently positioned so as to be accessible to the driver of the automobile, provide a positive oil pressure pipe to each desired point for application of oil, a visible check on the operation of the individual oil lines, a separate control or setting for each line, a common oil container, a common source of force feed pressure, an automatic cut off for the whole system operative upon cutting off the fuel supply to the engine, and all the above in simple apparatus easily installed by any mechanic.

I attain the objects outlined above by the apparatus shown in the accompanying drawings and in which:

Figure 1 is a perspective view of an automobile with certain parts omitted and showing my automatic lubricating mechanism in place;

Figure 2 is an enlarged section of a portion of the dash showing the relative position of the oil manifold, oil and pressure storage tanks, et cetera;

Figure 3 is a front view of the individual oil pipe controls, and Figure 4 an enlarged detail of the automatic cut-off.

With further reference to the figures, particularly Figure 1, the apparatus comprises a main oil supply tank (1) preferably secured in front of the dash, an oil manifold (2) preferably secured in back of the dash and from which a multitude of oil tubes or pipes (3) lead to all parts of the automobile requiring oiling.

Also in front of the dash is a gas pressure tank (4) for delivering pressure to the space above the oil in tank (1) for forcing the oil through the manifold and tubes (3).

To create pressure in the tank (4), it is connected by a pipe (5) to the compression side of any one of the engine cylinders. This may be done in various ways, but I prefer to make the aforesaid connection through the side of a spark plug by a hole drilled through the plug to communicate with its central channel.

In Figure 1 the engine is represented at (6) and the spark plug alluded to (7). In Figure 2 the connection is more clearly shown as the plug (7) is represented as removed from the engine and turned in a vertical plane to show the pipe (5) screwed into the side of the plug.

To permit insertion or removal of the plug for cleaning, the pipe (5) has a suitable union (8) for disconnection. Also on the pipe (5) is a check valve (9) to hold the gas pressure in the tank (4) and prevent it being withdrawn upon the suction stroke of the engine, or lost when the engine is at rest.

A safety blow off valve is positioned on the pressure tank (4) as shown at (18) and a pipe (10) connects the pressure tank to the space in the oil tank for delivering pressure to the oil, and this pipe (10) is provided with a cut off valve (11) mechanically connected for operation by the accelerator pedal (12) as indicated at (19) so that it will open only upon pressing on the accelerator and always be closed off when the accelerator is released, thus insuring that no pressure will be on the oil lines when the car is at rest.

The oil lines may be of any number and they lead to all points around the car which it is desired to oil, such as the clutch and brake levers, spring shackles, steering gear, or the engine parts if desired.

In Figure 1 the pipes (3) are dotted as extending to the different parts of the car, and where the pipes connect to more or less movable parts such as drag links or the like, flexible tubing may constitute part of the oil pipe leading to that part to permit movability thereof.

Each pipe connects to the manifold (2) through a separate control valve (13) preferably bearing on the face of its adjusting wheel the name of the part to which its oil pipe extends as indicated in Figure 3. Just below each valve (13) is a glass sight tube (14) for determining the oil feed.

The manifold (2) receives its supply of oil under pressure from the oil tank (1) through the pipe (15) and a main shut off valve (16) is provided on the pipe at its juncture with the manifold so as to be easily accessible to the driver.

The accelerator controlled valve (11) instead of being on the gas pressure pipe (10) will be equally effective if placed on the pipe (15) to close off the oil to the manifold from the oil tank, it simply being necessary to lead pipe (15) adjacent the accelerator in order to accomplish this, or the valve may be operated by any portion of the throttle mechanism other than the accelerator.

Also, the pressure tank (4) might be dispensed with where the free space in the oil tank was sufficient and the pressure pipe (5) connected direct to the oil tank, but I prefer the separate pressure tank as it enables one to blow off any accumulated condensation through the drain valve (17).

While the drawings hereto show one way of carrying out my invention, it is evident that many modifications in its specific arrangement are possible without passing beyond the scope of the invention and any such modifications are intended to be covered in my appended claims.

I claim:

1. In an apparatus for lubricating an automobile, an oil reservoir, a plurality of oil feeds therefrom to various parts of the automobile for lubricating same, a gas pressure tank, a communicating pipe between the tank and reservoir, and means for supplying compressed gas from the engine of the automobile to the tank.

2. In an apparatus for lubricating an automobile, an oil reservoir, a plurality of oil feeds therefrom to various parts of the automobile for lubricating same, a gas pressure tank, a communicating pipe between the tank and reservoir, means for supplying compressed gas from the engine of the automobile to the tank, and a shut off valve on the communicating pipe.

3. In an apparatus for lubricating an automobile, an oil reservoir, a plurality of oil feeds therefrom to various parts of the automobile for lubricating same, a gas pressure tank, a communicating pipe between the tank and reservoir, a communicating pipe from the tank to the engine of the automobile for supplying compressed gas to the tank, and a shut off valve on either pipe connected for opening and closing with the engine throttle.

4. In an apparatus for lubricating an automobile, an oil reservoir, means for supplying compressed gas thereto for forcing out the oil, a pipe manifold situated on the dash of the automobile and communicating with the oil in the reservoir, a plurality of pipes from the manifold leading to various parts of the automobile to be lubricated, a controlling valve on each pipe at the manifold, and a sight glass forming part of the pipe.

5. In an apparatus for lubricating an automobile, an oil reservoir, means for supplying compressed gas thereto for forcing out the oil, a pipe manifold situated on the dash of the automobile and communicating with the oil in the reservoir, a plurality of pipes from the manifold leading to various parts of the automobile to be lubricated, a controlling valve on each pipe at the manifold, and a sight glass between each valve and its pipe.

6. In an apparatus for lubricating an automobile, an oil reservoir, a plurality of pipes therefrom to various parts of the automobile for lubricating same, a pipe for supplying gas under compression from the engine of the automobile to the reservoir, said pipe communicating with the compression end of a cylinder of the engine through the side wall of a spark plug thereof substantially as shown in the drawings hereto.

LEWIS E. DURRIN.